United States Patent
Register, III et al.

(10) Patent No.: US 8,909,012 B2
(45) Date of Patent: Dec. 9, 2014

(54) HYBRID CABLE INCLUDING FIBER-OPTIC AND ELECTRICAL-CONDUCTOR STRANDED ELEMENTS

(71) Applicant: Corning Cable Systems LLC, Hickory, NC (US)

(72) Inventors: James Arthur Register, III, Hickory, NC (US); David Henry Smith, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 63 days.

(21) Appl. No.: 13/787,062

(22) Filed: Mar. 6, 2013

(65) Prior Publication Data

US 2013/0287348 A1 Oct. 31, 2013

Related U.S. Application Data

(60) Provisional application No. 61/639,528, filed on Apr. 27, 2012.

(51) Int. Cl.
*G02B 6/44* (2006.01)
*H01B 11/22* (2006.01)

(52) U.S. Cl.
CPC ............ *H01B 11/22* (2013.01); *G02B 6/4416* (2013.01)
USPC ........... 385/101; 385/100; 385/102; 385/103; 385/104; 385/10

(58) Field of Classification Search
USPC ......... 385/100, 101, 102, 103, 104, 105, 106, 385/107
See application file for complete search history.

(56) References Cited

U.S. PATENT DOCUMENTS

| 4,407,561 A | * | 10/1983 | Wysocki | ................ 385/128 |
| 5,325,457 A | | 6/1994 | Bottoms, Jr. et al. | ......... 385/113 |

(Continued)

FOREIGN PATENT DOCUMENTS

| CN | 102222546 A | 10/2011 | ............. H01B 11/22 |
| CN | 202067602 U | 12/2011 | ............. H01B 11/22 |

(Continued)

OTHER PUBLICATIONS

Nexans, "Outdoor hybrid cables (unshielded)," Retrieved on Jun. 23, 2014 from http://www.nexans.fr/eservice/France-en/pdf-family_9444/Outdoor_hybrid_cables_unshielded_.pdf—3 pages.

(Continued)

*Primary Examiner* — Jennifer Doan

(57) ABSTRACT

A hybrid cable includes a guide in the center of the cable, elements stranded side-by-side with one another around the guide, fiber optic elements including optical fibers, a metal armor, and a polymeric jacket of the cable surrounding the metal armor. The elements stranded side-by-side with one another around the guide include electrical-conductor elements, which themselves include stranded metal wires insulated in a jacket of the electrical-conductor elements. The electrical-conductor elements are round and have the same diameter as one another. Furthermore, the electrical-conductor elements are each within the range of 10 American wire gauge (AWG) to 1\0 AWG. The fiber optic elements may be included in or integrated with the group of elements stranded side-by-side with one another around the guide. The metal armor surrounds the elements stranded side-by-side with one another around the guide, and serves as a grounding conductor and an electro-magnetic interference shield.

20 Claims, 12 Drawing Sheets

(56) References Cited

U.S. PATENT DOCUMENTS

| | | | |
|---|---|---|---|
| 5,651,081 A | 7/1997 | Blew et al. | 385/101 |
| 5,917,977 A | 6/1999 | Barrett | 385/101 |
| 6,195,487 B1 | 2/2001 | Anderson et al. | 385/101 |
| 6,236,789 B1 | 5/2001 | Fitz | 385/101 |
| 6,738,547 B2 | 5/2004 | Spooner | 385/101 |
| 7,310,430 B1 * | 12/2007 | Mallya et al. | 382/101 |
| 7,643,713 B2 | 1/2010 | Büthe et al. | 385/101 |
| 8,285,095 B2 | 10/2012 | Han et al. | 385/101 |
| 2002/0001441 A1 | 1/2002 | Avellanet | 385/104 |
| 2008/0037941 A1 | 2/2008 | Mallya et al. | 385/101 |
| 2012/0008904 A1 | 1/2012 | Han et al. | 385/101 |
| 2012/0281953 A1 | 11/2012 | Choi et al. | 385/101 |
| 2014/0064680 A1 | 3/2014 | Register, III et al. | 385/101 |
| 2014/0064681 A1 | 3/2014 | Register, III et al. | 385/101 |

FOREIGN PATENT DOCUMENTS

| | | | |
|---|---|---|---|
| CN | 202093884 U | 12/2011 | H01B 11/22 |
| CN | 202134260 U | 2/2012 | H01B 9/00 |

OTHER PUBLICATIONS

D.L. Collado, B.G. Risch, D.J. Yamasaki, J.D. Gustitus, & J.R. Sach, "Technical Considerations for Composite Cables in Fiber-To-The-Antenna (FTTA) Applications," Copyright 2013, *Proceedings of the $62^{nd}$ International Wire & Cable Symposium Conference*, pp. 670-678; Retrieved on Jun. 20, 2014; Available at http://iwcs.omnibooksonline.com/data/papers/2013/14-1.pdf.

Draka, "ezMOBILITY™ Solutions," Copyright 2011, pp. 1-4; Retrieved on Jun. 20, 2014; Available at http://www.truenorthtech.com/pdf/ezMOBILITY%20Brochure.pdf.

Draka & Prysmian, "4G Hybrid Cable: Solution for FTTA Wireless Applications," Copyright 2014, pp. 1-2; Retrieved on Jun. 20, 2014; Available at http://na.prysmiangroup.com/en/business_markets/markets/telecom-solutions/resources/datasheets/500D_DS303_4G_FTTA_WIRELESS_0514.pdf.

* cited by examiner

HYBRID CABLE INCLUDING FIBER-OPTIC AND ELECTRICAL-CONDUCTOR STRANDED ELEMENTS

RELATED APPLICATIONS

This application claims the benefit of priority under 35 U.S.C. §119 of U.S. Provisional Application Ser. No. 61/639,528 filed on Apr. 27, 2012, the content of which is relied upon and incorporated herein by reference in its entirety.

BACKGROUND

Aspects of the present disclosure relate generally to hybrid cables that include both fiber-optic and electrical-conductor elements. More specifically, aspects of the present disclosure relate to a hybrid cable having fiber-optic and electrical-conductor elements stranded together for use with fiber-to-the-antenna applications.

SUMMARY

One embodiment relates to a hybrid cable, which includes a guide in the center of the cable, elements stranded side-by-side with one another around the guide, fiber optic elements (e.g., a bound or contained group of optical fiber(s)) including optical fibers, a metal armor, and a polymeric jacket of the cable surrounding the metal armor. The elements stranded side-by-side with one another around the guide include electrical-conductor elements, which themselves include stranded metal wires insulated in a jacket of the electrical-conductor elements. The electrical-conductor elements are round and have the same diameter as one another. Furthermore, the electrical-conductor elements are each within the range of 10 American wire gauge (AWG) to 1\0 AWG. The fiber optic elements may be included in or integrated with the group of elements stranded side-by-side with one another around the guide. The metal armor surrounds the elements stranded side-by-side with one another around the guide, and serves as a grounding conductor and an electro-magnetic interference shield.

Another embodiment relates to a hybrid cable, which includes a first layer of elements stranded side-by-side with one another around a center of the cable and a second layer of elements stranded side-by-side with one another around the first layer of elements. The elements of either or both of the layers include electrical-conductor elements comprising stranded metal wires insulated in a jacket of the electrical-conductor elements and fiber-optic elements. The electrical-conductor elements are round and have the same diameter as one another. Furthermore, the electrical-conductor elements are each within the range of 10 American wire gauge (AWG) to 1\0 AWG. The fiber-optic elements have fiber optic tubes with optical fibers that are round, where the tubes have a diameter within a range of +10% to −20% of the diameter shared by the conductor elements. The hybrid cable also includes a metal armor and a polymeric jacket of the cable surrounding the metal armor. The metal armor surrounds the second layer of elements and serves as a grounding conductor and an electro-magnetic interference shield.

Yet another embodiment relates to a hybrid cable, which includes a guide in the center of the cable, elements stranded side-by-side with one another around the guide, and a polymeric jacket of the cable. The elements include electrical-conductor elements and fiber optic elements. The electrical-conductor elements include stranded metal wires insulated in a jacket of the electrical-conductor elements. Furthermore, the electrical-conductor elements are round and have the same diameter as one another. A tube(s) of the fiber optic element(s) contains optical fibers, where the tube is stranded about the guide between two of the electrical-conductor elements. The tube is round and has a diameter within a range of +10% to −20% of the diameter shared by the conductor elements. The average spacing of adjacent elements of the elements stranded side-by-side with one another around the guide is greater than 2% of the periphery of a polygon defined by lines connecting centers of the elements stranded side-by-side with one another around the guide.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Cellular service providers may deploy Remote Radio Head (RRH) solutions throughout their antenna networks, a process that involves locating power radio frequency (RF) amplifiers at the top of the antenna (e.g., cell tower; radio tower; cell site). Remote Radio Head (RRH) solutions accordingly require cabling arrangements that deliver both power for the amplifiers and the high bandwidth capabilities of a fiber cable. Such arrangement may vary widely, but one suitable arrangement includes use of a cable that combines electrical conductors with fiber optic cables under a single cable jacket, known as a hybrid cable.

Hybrid cables (e.g., cables of FIGS. 1-12 disclosed herein) include fiber optic subunits stranded (for enhanced optical performance and overall cable flexibility) with relatively-high capacity electrical conductors ranging from 10 AWG to 1/0 AWG (i.e., about 5.26-53.5 $mm^2$ area, about 2.588-8.252 mm diameter, about 3.86-1.21 turns of wire per cm, and about 3.277-0.3224 Ω/km for stranded wires, or the equivalent). Typically such heavy conductors may not be stranded due to the associated forces required to bend and constrain the conductors, and/or because stranding adds length, increasing cable manufacturing expenses due to material costs (e.g., copper). However, Applicants have found that stranding the fiber optic subunits with the conductors provides a robust hybrid cable, with improved data transmission (e.g., less attenuation of the optical fibers).

Aspects of the present disclosure relate to the placement and size of the individual stranded elements (e.g., fiber optic tubes and conductors) of the hybrid cables in order to improve the cost, size, and data-transmission performance of the design. Stable hybrid cable cores, due to stranding as well as the placement and size of the stranded elements as disclosed herein, also contribute to the long-term improved performance, weather-ability, and stability of the cable due to enhanced mechanical coupling between the stranded elements.

Figure 1:
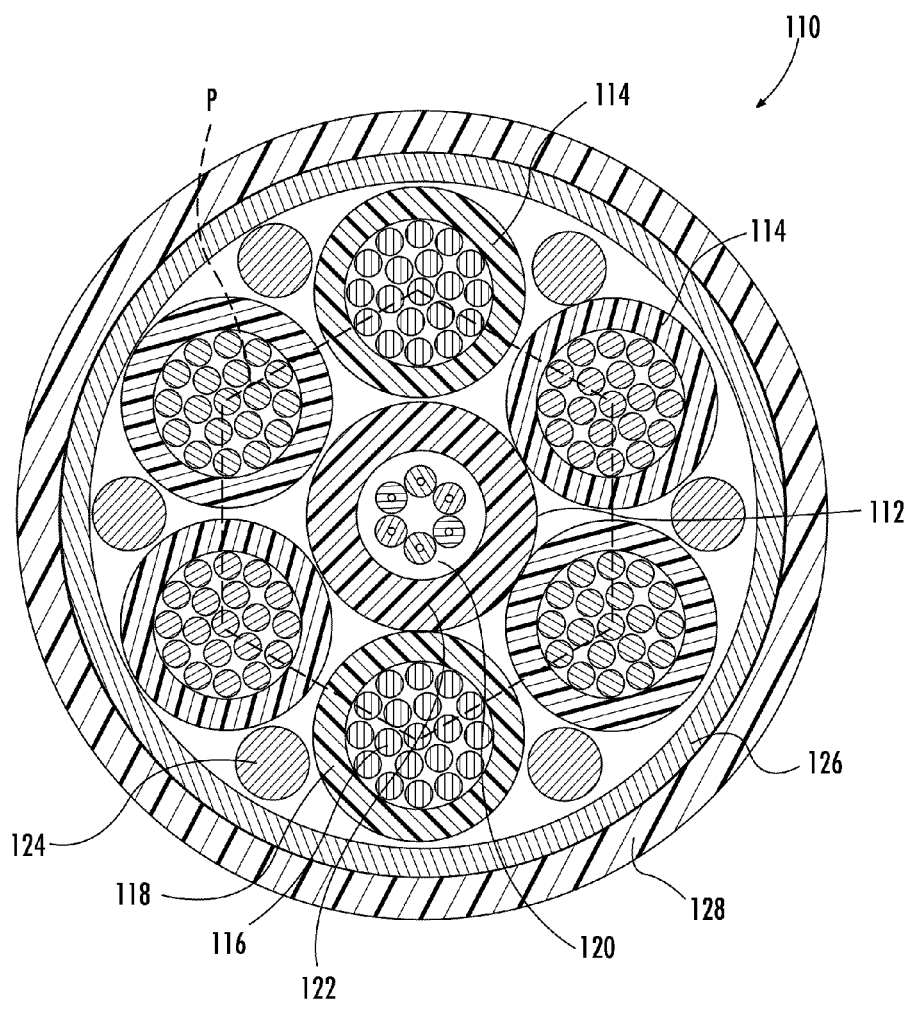
FIGS. 1 and 3-12 are radial cross-section views of hybrid cables according to exemplary embodiments.

Referring to FIG. 1, a hybrid cable 110 includes elements 114 stranded around a central guide 112. The elements 114 include stranded copper conductors 116 (e.g., 8 AWG) insulated in polyvinyl chloride (PVC) jackets 118 (or another polymeric material, such as fire-retardant (FR) polyethylene (PE)). The diameter of the cable (i.e., outer diameter of the radial cross-section, as shown in FIG. 1) is less than 20 mm due to the efficient arrangement of internal cable components, but may also be greater than 10 mm. The central guide 112 (e.g., central member) of the cable provides a surface for stranding the elements 114 (e.g., winding, helically wrapping), and also includes optical fiber elements 120 in the form of tight-buffered optical fibers (see also FIG. 2) within a polymeric tube 122 (e.g., outdoor-rated PVC jacket).

According to an exemplary embodiment, aramid yarn or other strength members may be included within the tube 122 of the guide 112. Filler rods 124 are positioned in the interstitial spaces between stranded elements 114, and armor 126 surrounds the stranded elements 114. According to an exemplary embodiment, the armor 126 may be a corrugated steel, copper, or aluminum armor, which also serves as a ground conductor and/or an electro-magnetic interference (EMI) shield. In other embodiments, the armor may be dielectric. Exterior to the armor 126, the cable 110 includes a polymeric jacket 128 (e.g., PE, FR PE, medium density PE, zero-halogen polymer, outdoor PVC). In various alternate embodiments, the conductors 116 are relatively high-capacity conductors, in the range of 10 AWG to 1\0 AWG (e.g., 8 gauge, 6 gauge), providing a large electrical capacity for powerful electrical equipment (e.g., cell site, radar, FTTA applications), as well as providing axial strength to the cable.

Aspects of the present disclosure relate to the particular efficient placements and uses of the stranded elements 114 and structure of the cable 110, as opposed to the general concept of a hybrid cable containing both optical fibers and conductors. For example, stranding of the elements 114 of about the same size as one another and in close proximity to one another, as disclosed herein, provides for improved cable 110 flexibility, as well as improved performance of the optical elements 120 (e.g., less attenuation than un-stranded cables).

Figure 2:
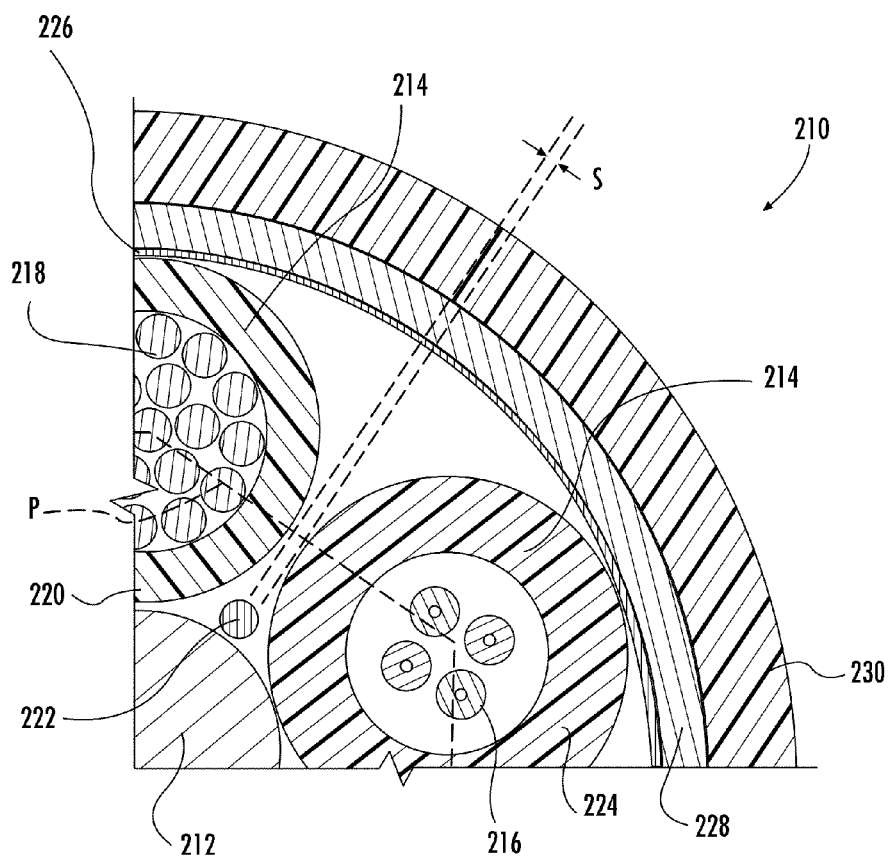
FIG. 2 is a radial cross-section view of a portion of a hybrid cable according to an exemplary embodiment.
Figure 3:
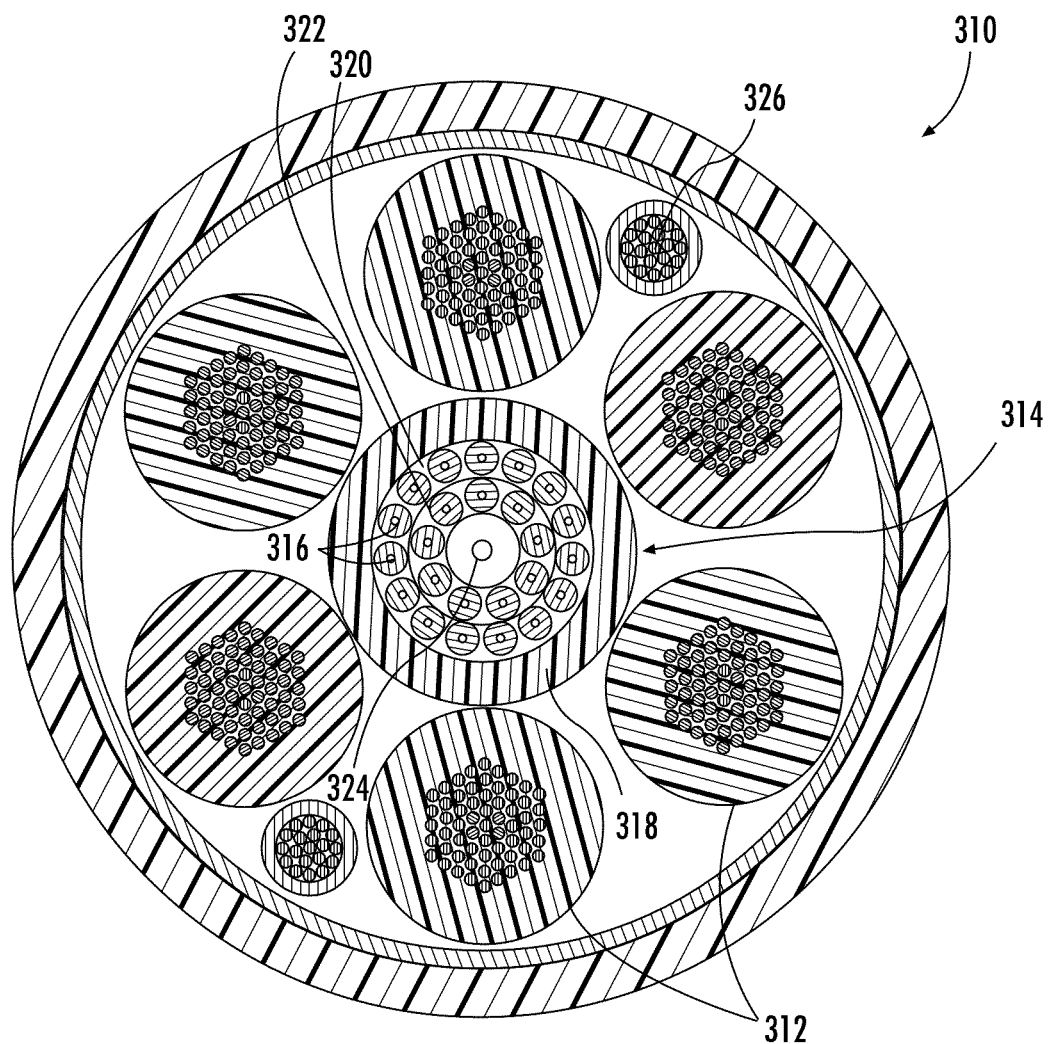

Referring to FIG. 2, spacing S between stranded elements 214 of a hybrid cable 210 is designed to provide a robust cable structure. According to an exemplary embodiment, a polygon P (see also FIG. 1) may be defined as passing through the centers of adjoining elements 214 stranded about a guide 212. The exteriors of the elements 214 are spaced apart from one another at the narrowest distance of the radial cross-section (e.g., shown in FIGS. 1-12) by an average distance of separation (i.e., spacing S) of at least 2% of the total periphery of the polygon, but less than 20% of the periphery (i.e., gap or spacing between stranded elements is between 2-20%), preferably less than 15%, such as 12% or less; where 'average' distance refers to the net space of all gaps between adjoining stranded elements divided by the total number of adjoining stranded elements (such as all elements 312 around a core 314 as shown in FIG. 3; or all elements on a single layer 612 or 614, as shown in FIG. 6). Such spacing S provides for enough room to account for inaccuracies in tolerances of the sizing of the elements (e.g., subtle changes in diameter) so that the stranded elements 214 fit easily together, without radially loading one another; as well as provides for stable positioning, reducing the ability of the stranded elements 214 to shift or migrate within the jacket, especially when the cable 210 is bending. Alternatively, an average gap or spacing may be between 2-10% of a circumference of a circle intersecting centers of stranded elements, in embodiments where the adjoining stranded elements are of the same diameter.

The cable 210 of FIG. 2 may further include fiber optic elements 216 and electrical-conductor elements 218 in an insulator jacket 220 (e.g., PVC) stranded about the guide 212, with a water blocking yarn 222 therebetween. The fiber optic elements 216 are contained in a tube 224 (e.g., the tube mostly consisting of medium density PE). Exterior to the stranded elements 214, the cable 210 includes a water-blocking tape 226, surrounded by armor 228, in turn surrounded by a polymeric jacket 230.

Referring to FIG. 3, a hybrid cable 310 includes at least six electrical-conductor elements 312 stranded about a guide 314 that includes at least 24 tight-buffered optical fibers 316 in a tube 318. The tight-buffered optical fibers 316 are stranded in two discrete layers 320, 322 about a central glass-reinforced plastic (GRP) rod 324. The electrical-conductor elements 312 are insulated and include 6 AWG copper. In other embodiments, the conductors of the cables disclosed herein may be aluminum. Two 18 AWG alarm conductors 326 are included in the interstitial space to the outside of the stranded electrical-conductor elements 312, which may carry an alarm signal; such as if connected hardware requires maintenance. The 18 AWG conductors 326 may carry other signals as well.

Figure 4:
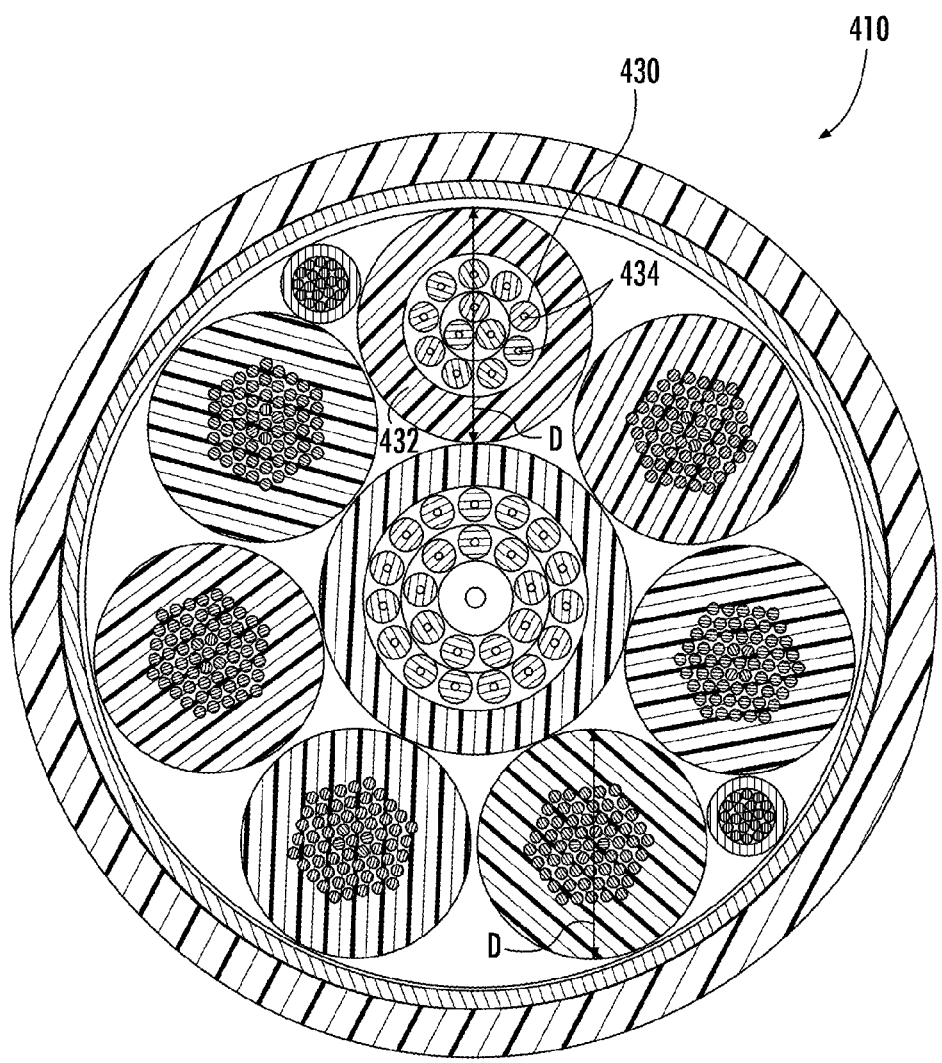

Referring to both FIGS. 3-4, a hybrid cable 410 of FIG. 4, similar to the cable of FIG. 3, further includes an optical element 430 stranded about the guide 314. The optical element 430 is contained in a polymeric jacket 432 (e.g., tube, buffer tube) and that includes at least twelve fibers 434. Notably the stranded optical element 430 has fewer fibers 434 and a smaller diameter than the tube 318 integrated with the central guide member 314 (see FIG. 3).

According to an exemplary embodiment, the 6 AWG conductors 312 of either FIG. 3 or FIG. 4 share a common diameter D (e.g., within reasonable tolerances; e.g., within 10% of one another). According to an exemplary embodiment, the tube 432, containing fiber optic elements and stranded about the guide 318, has a diameter D' within a range of +10% to −20% of the diameter D shared by the 6 AWG conductor elements 312. Sizing the fiber optic tubes 432 to match the conductor 312 diameters D improves the robustness of the hybrid cable 410 by reducing the volume of interstitial space within the cable 410, and correspondingly reducing the volume of space available for migration of the stranded elements 312, 430. Correspondingly, the optical fibers 434 carried by the cable 410 generally have less stress when compared cables without such sizing, particularly in bending, due to movement of the elements 312, 430.

Figure 5:
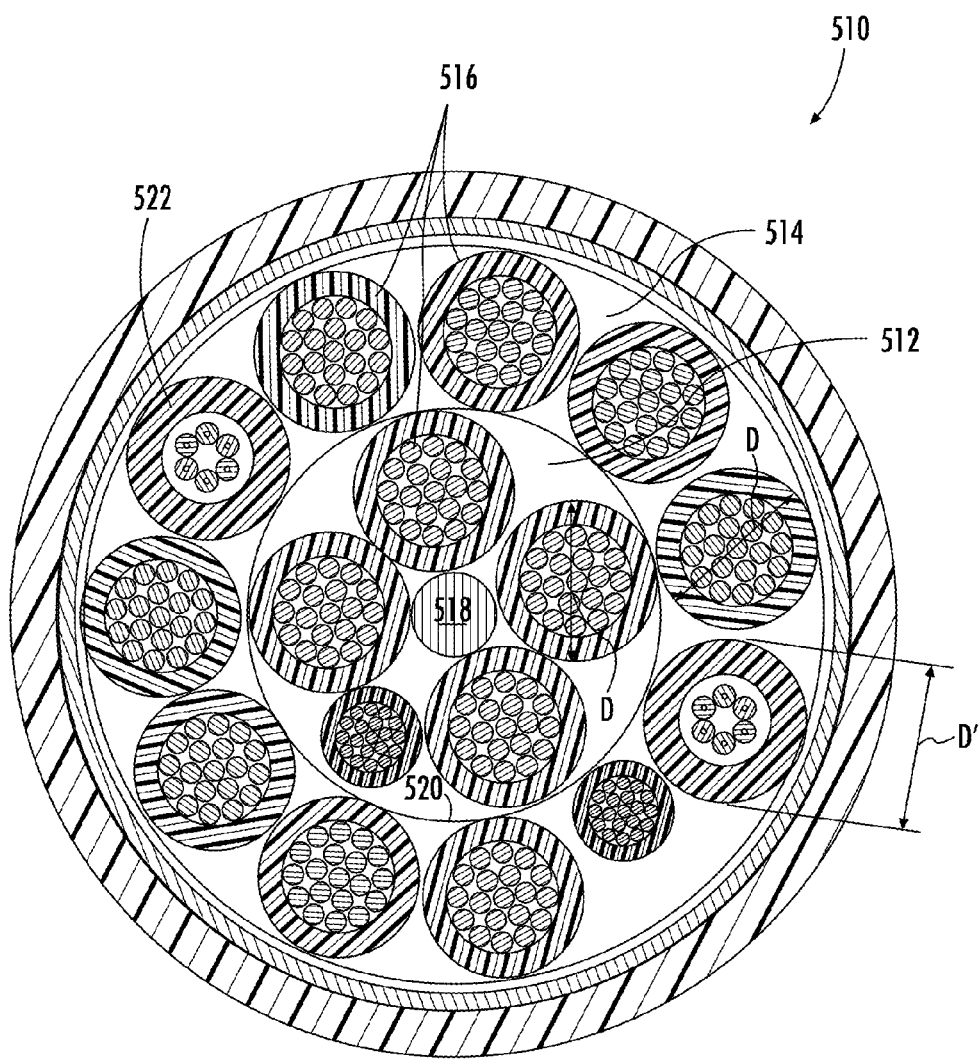
Figure 6:
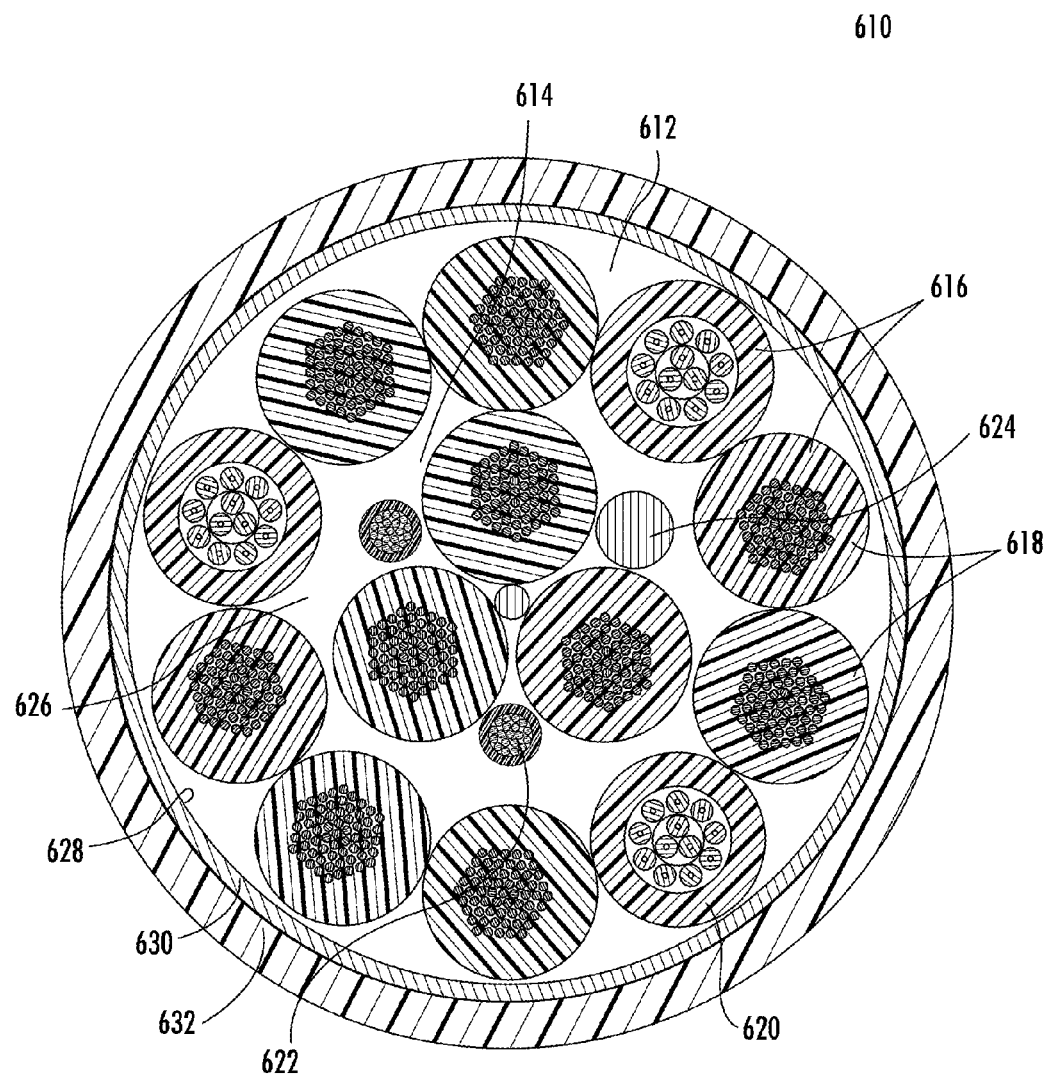

Referring to FIG. 5, a hybrid fiber optic cable 510 includes first and second layers 512, 514 of stranded elements 516. The first layer 512 of stranded elements 516 are stranded about a central member 518 (e.g., GRP rod). Surrounding the first layer 512, a water-swellable tape 520 and/or a binder at least partially fills the interstitial space. The second layer 514 includes additional stranded elements 516. According to an exemplary embodiment, the second layer 514 includes at least six more stranded elements 516 than the first layer 512. In other contemplated embodiments, a third layer correspondingly includes six more elements than the second layer, and so forth. Applicants have found that the number the elements of layers according to this rule (1 mod 6 elements per layer) provides a compact configuration, including the above-described low-attenuation benefits to the optical elements. Also of note, tubes 522 containing the fiber optic elements are positioned in the exterior-most layer, providing ease of access thereto when opening the cable 510.

According to an exemplary embodiment, the lay length of the stranded elements 516 of cable 510, and/or any of the other cables disclosed herein, is between 350-450 mm, providing a good empirically-derived balance between element length, cable flexibility, and low-attenuation of optical fibers. Further, the second layer 514 is stranded in an opposite direction to the first layer 512 (or mostly so for S-Z stranding of either or both layers), which avoids interstitial conversion of the layers 512, 514 that may increase attenuation due to extra bending of optical fibers. The optical fibers of FIG. 5 may be multi-mode fibers, but single-mode fibers may also or alternatively be included. Furthermore, the optical fibers may be loosely placed in buffer tubes, instead of the tight-buffer arrangements as shown; or even ribbons of optical fibers may be included in some contemplated embodiments.

Referring now to FIG. 6, a hybrid cable 610 includes first and second layers 612, 614 of stranded elements 616, where some of the elements 616 are electrical-conductor elements 618 and others of the elements are fiber optic elements 620. The cable 610 is greater than 30 mm in diameter, but less than 40 mm in diameter due to the compact configuration of stranded elements 616; and includes ten 6 AWG conductors 618, as well as three 12-fiber fiber optic subunits 620. Two 18 AWG conductors 622 and a filler rod 624 are positioned within the interstitial spaces surrounding the first layer 612 as well, below a water-blocking tape 626. Water-blocking tape 628 also surrounds the second layer 614, beneath copper armor 630, which serves as a particularly strong EMI shield below a polymeric jacket 632.

Figure 7:
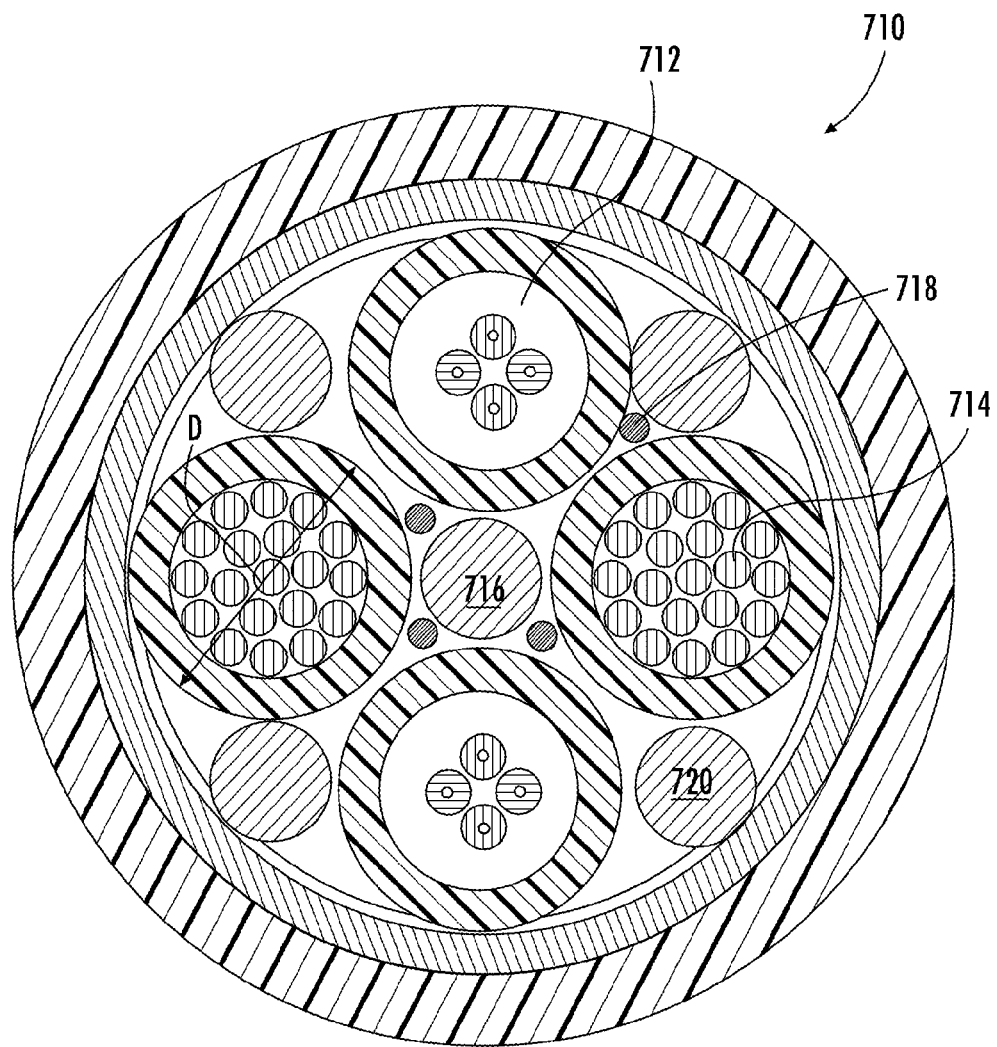
Figure 8:
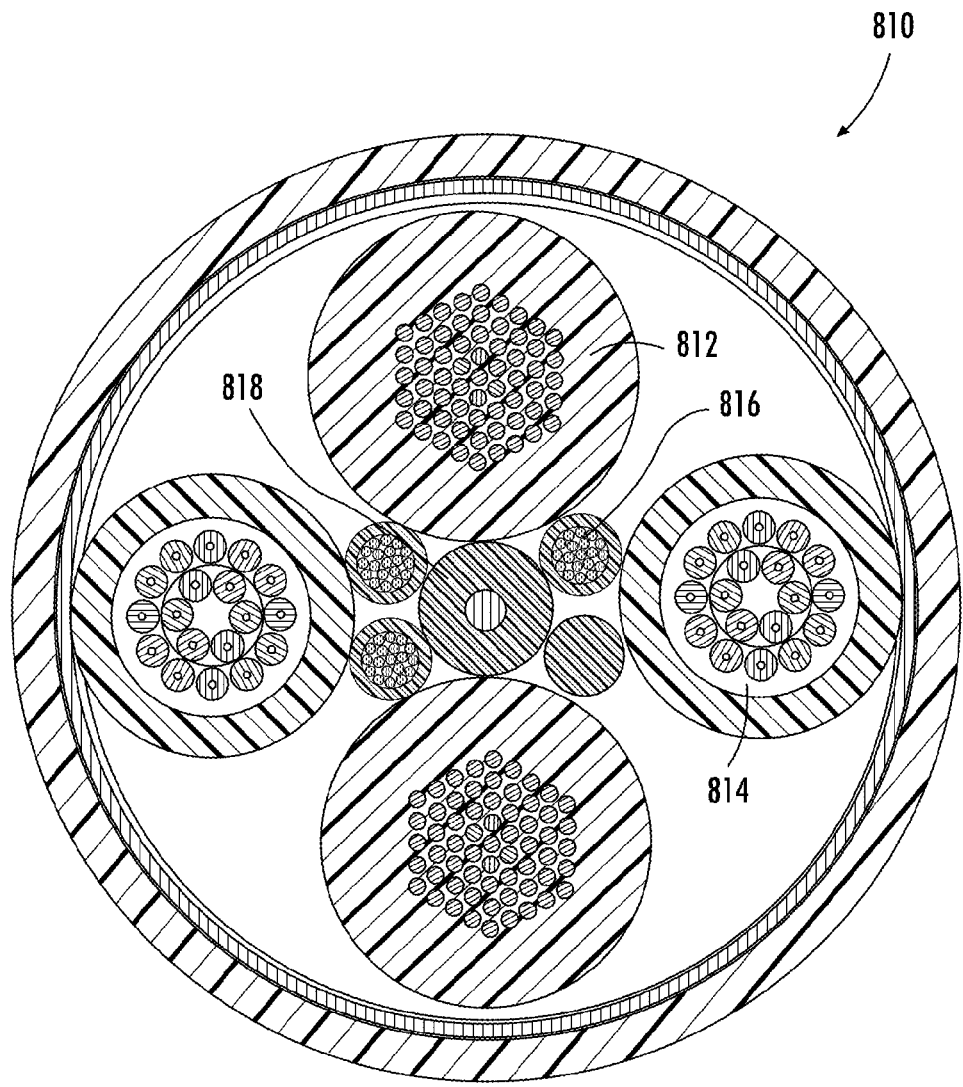
Figure 9:
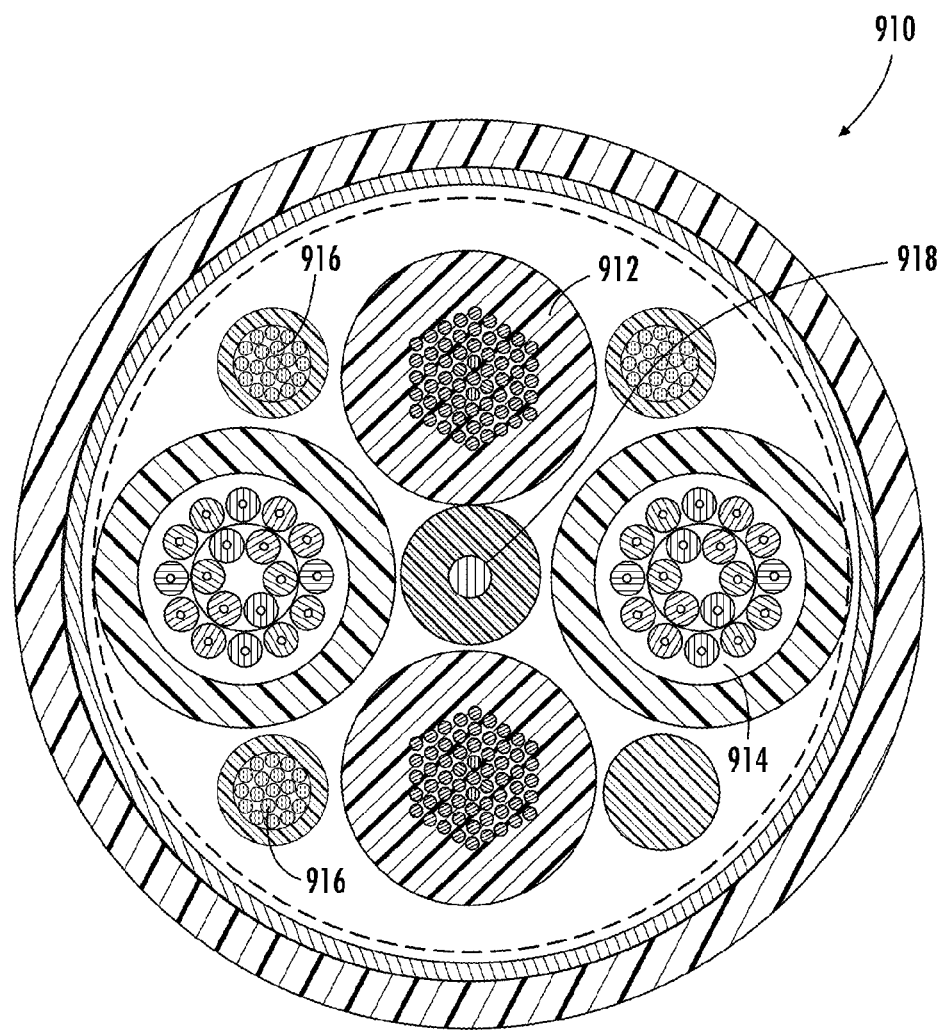
Figure 10:
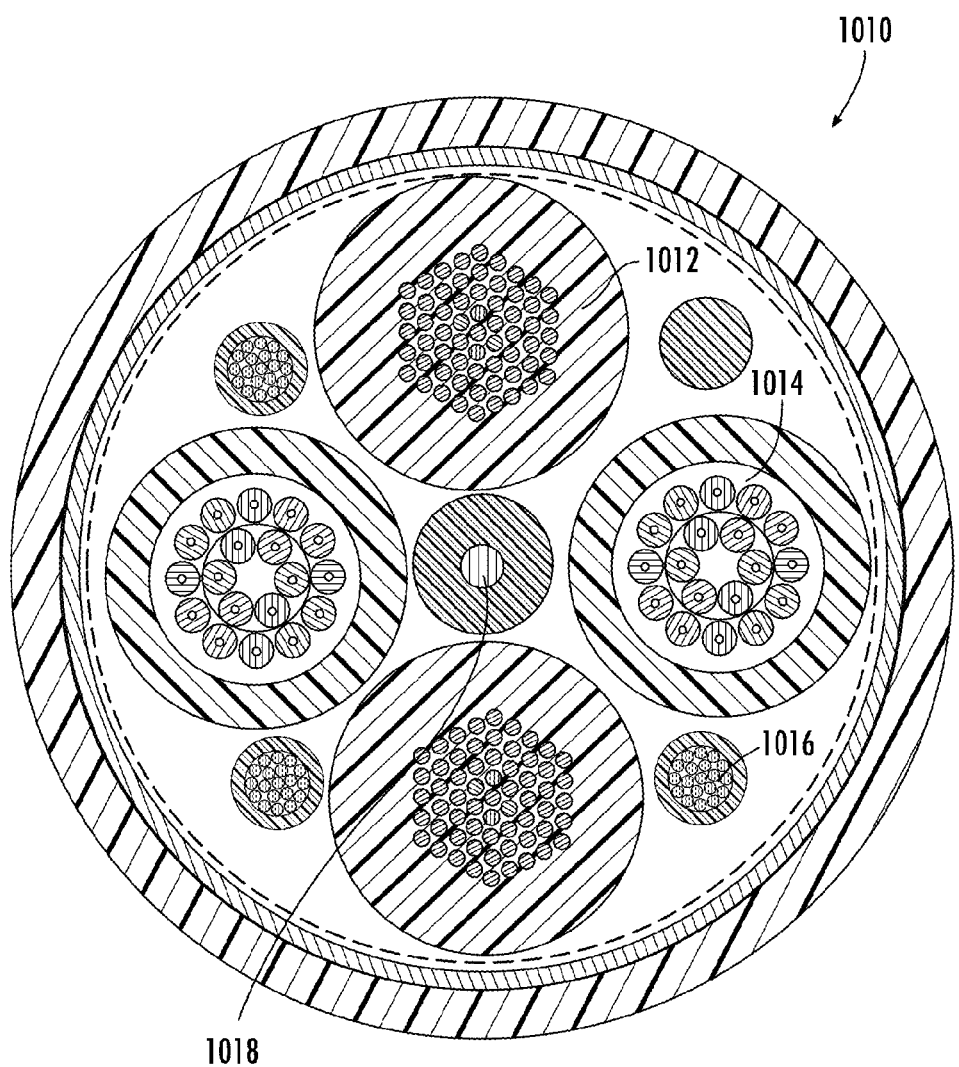

FIG. 7 includes a hybrid cable 710 having equal numbers of fiber optic and main electrical elements 712, 714 stranded about a central guide 716. Smaller water-blocking yarns 718 and larger filler rods 720 of GRP fill interstitial spaces between the stranded elements 712, 714. FIGS. 8-10 show various alternate embodiments of such hybrid cables 810, 910, 1010, with 2 AWG, 4 AWG, 6 AWG main-electrical conductors 812, 1012, 912, and 12-fiber fiber optic elements 814, 914, 1014. The hybrid cables 810, 910, 1010 also include 18 AWG alarm wires 816, 916, 1016 and a GRP central guide up-jacket with a polymer 818, 918, 1018, such as PE.

Figure 11:
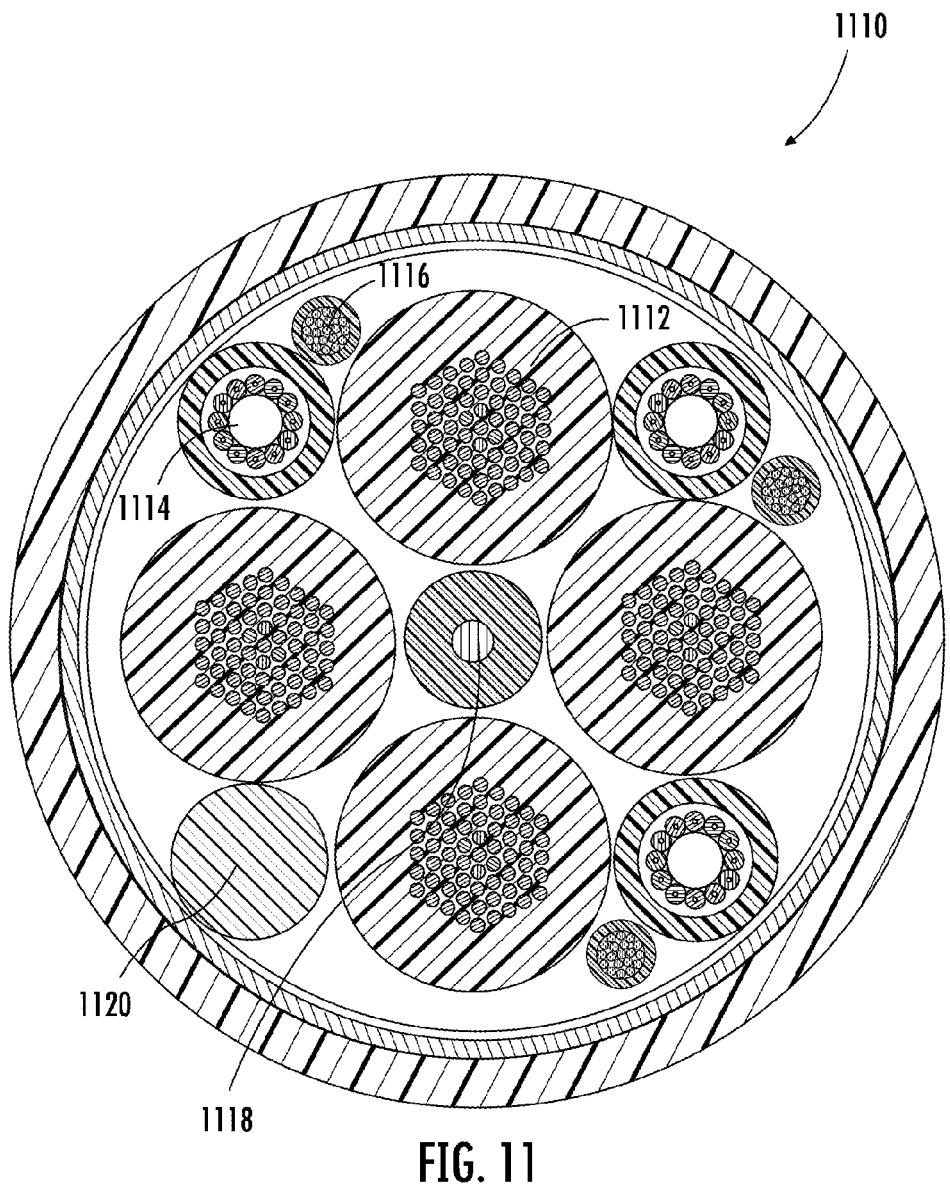
Figure 12:
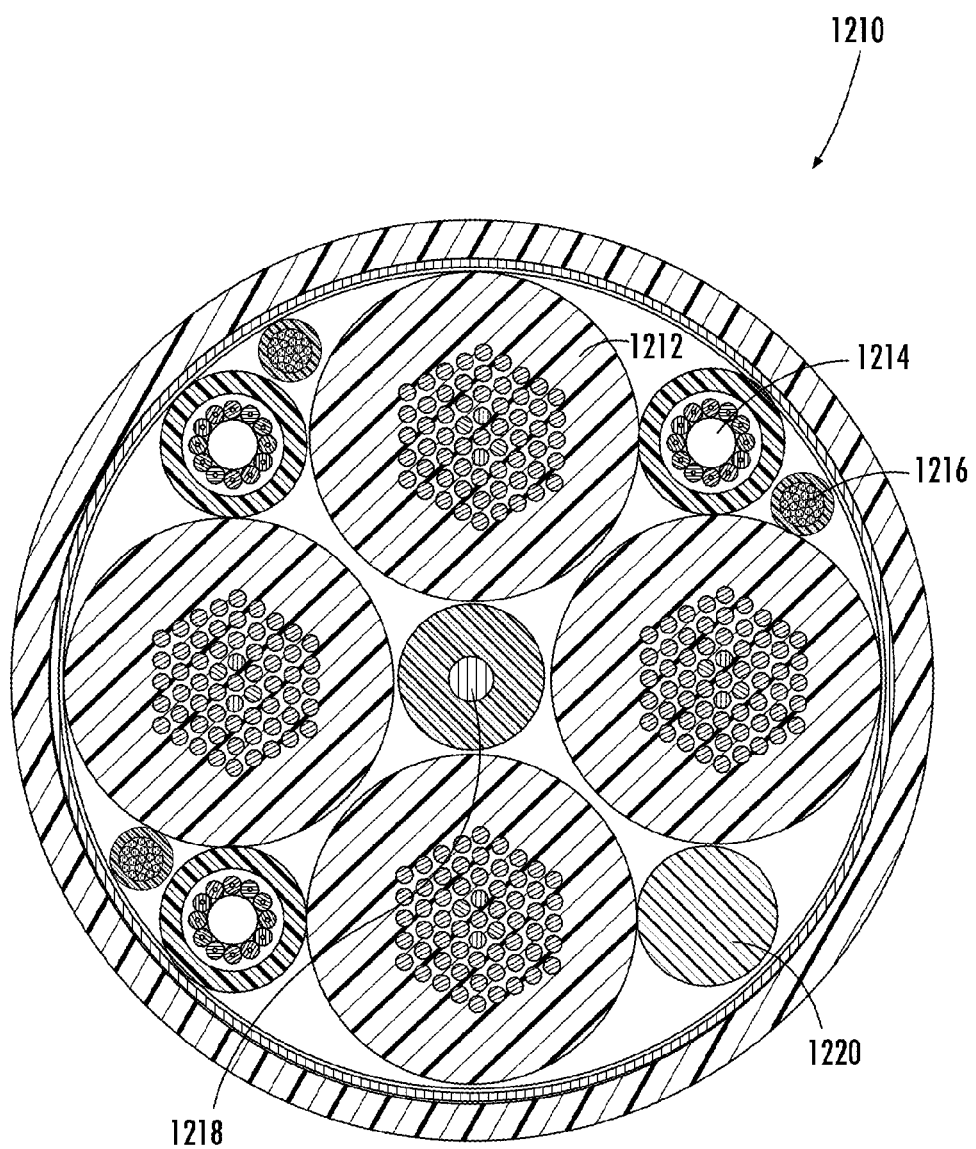

FIG. 11-12 include hybrid cables 1110, 1210 where the main electrical-conductor elements 1112, 1212 are substantially larger than the fiber optic elements 1114, 1214. For example, the electrical-conductor elements 1112 of FIG. 11 are 2 AWG, and those 1212 of FIG. 12 are 1/0 AWG. The 12-fiber fiber optic elements 1114, 1214 are positioned in the interstitial spaces to the exterior of the main electrical-conductor elements 1112, 1212, for ease of access and for providing a compact, robust hybrid cable configuration. The hybrid cables 1110, 1210 of FIGS. 11-12 also include 18 AWG alarm wires 1116, 1216, an up jacketed GRP central guide 1118, 1218, and a polyethylene filler rod 1120, 1220, which fills the interstitial space between two of the main electrical-conductor elements 1112, 1212 that is not occupied by a fiber-optic tube 1114, 1214 including optical fibers.

According to an exemplary embodiment, cables disclosed herein (e.g., cables or variations of cables of FIGS. 1-12, or features of such cables that may be readily combined), include a number of electrical conductors (e.g., ten or six 6-guage thermoplastic high heat-resistant nylon-coated (THHN) conductors) having a diameter D (see, e.g., FIG. 5) that is approximately equal to that diameter D' of a number of fiber optic tubes also included in the cable (e.g., less than 7 mm diameter D; about 6.3 mm diameter D). According to an exemplary embodiment, the difference in diameters D, D' of the stranded elements is less than 50% of the diameter of the larger of the diameters D, D' (e.g., less than 25%, less than 10%), or less than twice the diameter of the smaller of the diameters D, D' (e.g., less than 1.5 times; less than 1.25 times). In some embodiments, the fiber optic tubes contain multiple optical fibers, such as 36 or 24 fibers net. Applicants have found that standard THHN 6-guage copper conductors have diameters nearly matching those of standard-size buffer tubes of 12-fiber MIC® Cables manufactured by Corning Cable Systems), which may serve as fiber optic subunits. In other embodiments, machine tool wire (MTW) (more insulated than THHN) conductors may be used.

Closely sizing the buffer tubes and insulated conductors provides for a uniform shape and well-balanced, stranded cable structure, which in turn improves the performance of the associated optical fibers. According to an exemplary embodiment, single-mode optical fibers of the cables shown in FIGS. 1-12 or variations thereof have an attenuation of 0.4 DB/km or less for 1310 nm wavelength and of 0.3 DB/km or less for 1550 nm wavelength in the stranded configuration of the respective cables. Such attenuation is believed to be a significant improvement over hybrid cables that are un-stranded, particularly when the cables are in 90-degree bending. In other embodiments, the hybrid cables may include multi-mode fibers.

In some embodiments, the stranded elements (i.e., both fiber optic tubes and insulated conductors) are helically stranded, while in other embodiments the elements are S-Z stranded. Preferably, the larger diameter elements (e.g., 2 AWG or 1/0 AWG THHN or MTW) for larger cables (e.g., at least 30 mm in diameter) are helically stranded, due at least in part to reduced lateral loading by the elements upon the jacket within the cable, which allows for a thinner jacket. Other cables disclosed herein may be S-Z stranded, especially those of smaller diameters (e.g., less than 30 mm in diameter) and associated components.

Applicants have discovered that sizing the diameters of the fiber optic tubes to be close in size to that of the insulated conductors (e.g., within 20% diameter) allows for improved stranding of both elements about a central member. In a preferred embodiment, the stranded elements (i.e., both fiber optic tubes and insulated conductors) are stranded in groups of about seven mod six (e.g., 7, 13, 19, 25, . . . with one of the elements in the center), which allows for an even distribution of the elements about the central member with reduced shifting or asymmetry to the position of the elements in the cable. In some embodiments, multiple layers of stranded elements are included in the cable, where the outer layers are stranded about the inner layer(s), and where the innermost layer may be stranded about a central member (e.g., spacer, guide).

In at least one preferred embodiment, the fiber optic tube and optical components (i.e., fibers or ribbons) extend through the central guide member, and the conductors are stranded about the central guide member. A benefit for such an arrangement is that the fiber optic tube may be sized, such as via polyethylene up-jacketing, to provide improved spacing between the conductors that are stranded about the central member. The stranded conductors, in turn, provide a strength component to the cable, so that the central member need not be a strength member. In some contemplated embodiments, the center of the cable is interstitial space between stranded elements, lacking a solid body; or a guide includes more than one body wound together.

Various exemplary cable configurations are disclosed herein, which vary in particular sizes and ratios of components. Also, placement and numbers of components, such as 18-guage alarm wires, may be moved as will be known by those of skill in the art.

Regardless of the total number of stranded elements, Applicants have found that closely matching the diameter D, D' of each element improves the stability of the core. The electrical conductors are generally the most numerous and consistently sized elements so, when designing a cable, Applicants generally match the fiber optic units to these, within the range of +10% to −20% in outside diameter. If Applicants are still unable to meet the range of +10% to −20% in outside diameter, Applicants choose an electrical conductor of the same gauge, but with different insulation thicknesses (e.g. THHN vs. MTW).

Utilizing the described hybrid cable design features and design rules offers a number of advantages, including: (1) stable cable cores that allow for enhanced mechanical coupling between the cable elements, which should offer an improvement in long term cable stability in its installation environment; (2) the above-described features and techniques generally allow for a minimum-size cable cross-section, while containing the requisite stranded elements, where smaller cables are less expensive to make—particularly when considering the cost of an overall armor/shield; and (3) data transmission via optical performance will be improved relative to cables that do not include stranded elements, particularly around bends in the cable due at least in part to reduced tension of the optical fibers.

The construction and arrangements of the hybrid cable, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A hybrid cable, comprising:
    a guide in the center of the cable;
    elements stranded side-by-side with one another around the guide, wherein the elements comprise electrical-conductor elements comprising stranded metal wires insulated in a jacket of the electrical-conductor elements, wherein the electrical-conductor elements are round and have the same diameter as one another, wherein the electrical-conductor elements are each within the range of 10 American wire gauge (AWG) to 1\0 AWG;
    fiber optic elements comprising optical fibers;
    a metal armor surrounding the elements, wherein the metal armor serves as a grounding conductor and an electro-magnetic interference shield; and
    a polymeric jacket of the cable surrounding the metal armor.

2. The hybrid cable of claim 1, wherein at least some of the fiber optic elements are integrated with the guide in the center of the cable such that the electrical-conductor elements are stranded about the fiber optic elements.

3. The hybrid cable of claim 2, wherein the fiber optic elements integrated with the guide are stranded about a rod in the guide and are surrounded by a tube.

4. The hybrid cable of claim 3, wherein the tube of the fiber optic elements integrated with the guide has a different diameter than the diameter of the conductor elements.

5. The hybrid cable of claim 4, wherein the diameter of the tube of the fiber optic elements integrated with the guide is greater than the diameter of the conductor elements, whereby the guide facilitates spacing of the elements stranded around the guide.

6. The hybrid cable of claim 5, wherein the elements stranded around the guide consist of electrical-conductor elements.

7. The hybrid cable of claim 5, wherein the elements stranded around the guide further comprise a fiber optic element which comprises optical fibers within a second tube that is smaller than the tube of the fiber optic elements integrated with the guide.

8. The hybrid cable of claim 7, wherein the diameter of the second tube is within a range of +10% to −20% of the diameter shared by the conductor elements.

9. The hybrid cable of claim 1, wherein the fiber optic elements are contained in a round tube and have a diameter within a range of +10% to −20% of the diameter shared by the conductor elements.

10. The hybrid cable of claim 9, wherein the tube of the fiber optic elements is stranded about the guide between two of the electrical-conductor elements.

11. A hybrid cable, comprising:
    a first layer of elements stranded side-by-side with one another around a center of the cable;
    a second layer of elements stranded side-by-side with one another around the first layer of elements;
    wherein the elements comprise:
        electrical-conductor elements comprising stranded metal wires insulated in a jacket of the electrical-conductor elements, wherein the electrical-conductor elements are round and have the same diameter as one another, wherein the electrical-conductor elements are each within the range of 10 American wire gauge (AWG) to 1\0 AWG; and
        fiber-optic elements comprising optical fibers within a tube which is round and has a diameter within a range of +10% to −20% of the diameter shared by the conductor elements;
    a metal armor surrounding the second layer of elements, wherein the metal armor serves as a grounding conductor and an electro-magnetic interference shield; and
    a polymeric jacket of the cable surrounding the metal armor.

12. The hybrid cable of claim 11, wherein the first and second layers are separated from one another by a water-blocking tape comprising a super-absorbent-polymer water-swellable powder.

13. The hybrid cable of claim 11, wherein the second layer includes the fiber-optic elements, but the first layer does not; thereby providing ease of access to the optical fibers through the polymeric jacket of the cable.

14. The hybrid cable of claim 11, wherein the first and second layers are stranded counter to one another, thereby preventing interstitial conversion.

15. A hybrid cable, comprising:
a guide in the center of the cable;
elements stranded side-by-side with one another around the guide, wherein the elements comprise:
   electrical-conductor elements comprising stranded metal wires insulated in a jacket of the electrical-conductor elements, wherein the electrical-conductor elements are round and have the same diameter as one another; and
   a tube containing fiber optic elements comprising optical fibers, wherein the tube is round and has a diameter within a range of +10% to −20% of the diameter shared by the conductor elements, and wherein the tube of the fiber optic elements is stranded about the guide between two of the electrical-conductor elements;
wherein the average spacing of adjacent elements of the elements stranded side-by-side with one another around the guide is greater than 2% of the periphery of a polygon defined by lines connecting centers of the elements stranded side-by-side with one another around the guide; and
a polymeric jacket of the cable.

16. The hybrid cable of claim 15, wherein the average spacing of adjacent elements is less than 20% of the periphery.

17. The hybrid cable of claim 15, further comprising a metal armor surrounding the elements, wherein the metal armor serves as a grounding conductor and an electro-magnetic interference shield, and wherein the electrical-conductor elements are each within the range of 10 American wire gauge (AWG) to 1\0 AWG.

18. The hybrid cable of claim 15, wherein at least some of the fiber optic elements are integrated with the guide in the center of the cable such that the electrical-conductor elements are stranded about the fiber optic elements.

19. The hybrid cable of claim 18, wherein the fiber optic elements integrated with the guide are stranded about a rod in the guide and are surrounded by a second tube.

20. The hybrid cable of claim 19, wherein the second tube of the fiber optic elements integrated with the guide has a greater diameter than the diameter of the conductor elements.

* * * * *